(12) United States Patent
Clemente et al.

(10) Patent No.: US 9,715,773 B2
(45) Date of Patent: Jul. 25, 2017

(54) METHOD AND SYSTEM FOR ACCESS CONTROL

(71) Applicant: SKIDATA AG, Grödig/Salzburg (AT)

(72) Inventors: Jorge Clemente, Puch bei Hallein (AT); Thomas Schlechter, Seekirchen am Wallersee (AT); Reinhard Surkau, Traunstein (DE)

(73) Assignee: Skidata AG, Grödig/Salzburg (AT)

( * ) Notice: Subject to any disclaimer, the term of this patent is extended or adjusted under 35 U.S.C. 154(b) by 0 days.

(21) Appl. No.: 15/235,372

(22) Filed: Aug. 12, 2016

(65) Prior Publication Data
US 2017/0046889 A1 Feb. 16, 2017

(30) Foreign Application Priority Data
Aug. 14, 2015 (EP) .................................... 15181141

(51) Int. Cl.
*G07C 9/00* (2006.01)
*G07C 9/02* (2006.01)
*H04W 4/00* (2009.01)
*G07B 15/04* (2006.01)

(52) U.S. Cl.
CPC ..... *G07C 9/00007* (2013.01); *G07C 9/00031* (2013.01); *G07C 9/00309* (2013.01); *G07C 9/02* (2013.01); *H04W 4/008* (2013.01); *G07B 15/04* (2013.01); *G07C 2009/00769* (2013.01); *G07C 2209/63* (2013.01)

(58) Field of Classification Search
CPC ............ G07C 9/00007; G07C 9/00309; G07C 2009/00769; G07C 9/00119; G07C 9/02; G07C 9/00031; H04W 4/008; G07B 15/063; G07B 15/04

USPC ......................................................... 340/5.61
See application file for complete search history.

(56) References Cited

U.S. PATENT DOCUMENTS

| | | | |
|---|---|---|---|
| 8,587,454 B1 | 11/2013 | Dearworth | |
| 9,408,020 B2 * | 8/2016 | Povolny | ............... G07B 15/063 |
| 2010/0231415 A1 | 9/2010 | Roberts | |
| 2014/0015978 A1 | 1/2014 | Smith | |
| 2014/0285360 A1 | 9/2014 | Kohli et al. | |
| 2015/0056922 A1 | 2/2015 | Povolny et al. | |

(Continued)

OTHER PUBLICATIONS

European Search Report Corresponding to 15181141.1 mailed Mar. 11, 2016.

*Primary Examiner* — Ali Neyzari
(74) *Attorney, Agent, or Firm* — Davis & Bujold PLLC; Michael J. Bujold

(57) ABSTRACT

A method for access control wherein verification of access authorization is effected by evaluating an ID sent at regular intervals from a mobile electronic device or a data carrier nearest an access control device (3, 4, 5, 6), via bluetooth low energy standard as part of a "broadcasting", to which at least one access authorization is unequivocally assigned, which is received by BLE transceiver units (TRX-1, TRX-2, TRX-3, TRX-4) connected to a computer comprising a CPU and storage located within range of the mobile electronic device or the data carrier. Localization of the mobile electronic devices or the data carriers is carried out by evaluation of the RSSI, wherein the signal strength is measured, with which that signal of a mobile electronic device or a data carrier is received, which contains the ID of BLE transceiver units (TRX-1, TRX-2, TRX-3, TRX-4).

12 Claims, 2 Drawing Sheets

(56) References Cited

U.S. PATENT DOCUMENTS

2015/0084741 A1    3/2015  Bergdale et al.
2015/0134428 A1    5/2015  Li et al.
2016/0142868 A1*  5/2016  Kulkarni ............... H04W 4/008
                                                        455/456.5

* cited by examiner

METHOD AND SYSTEM FOR ACCESS CONTROL

FIELD OF THE INVENTION

The present invention relates to a method for access. Further the invention relates to an access control system, in particular for performing the method according to the invention.

BACKGROUND OF THE INVENTION

Methods and systems for access control for persons and vehicles are known from the state of the art. As a rule, provision is for access control to be carried out by means of the contactless reading of access authorizations, wherein access control devices are provided, which comprise means for detecting and evaluating the access authorizations as well as mechanical barriers or barriers realized in other ways, which after presentation of a valid access authorization automatically or manually change from a locked position to a released position.

Contactless reading of access control devices is, as a rule, effected with the aid of RFD reading devices comprising at least one RFID antenna unit, which communicates with RFID transponders as a data carrier for reading an access authorization. It is disadvantageous that the range of an RFID interaction performed according to the state of the art between a RFID antenna unit and a RFID transponder is relatively short. Long-range RFID interactions take place in the microwave range and consume a lot of energy, which means that they need their own power supply for supplying a RFID transponder with energy, which is disadvantageous.

A further disadvantage of the methods known from the art for access control by means of RFID interaction between a reading device and a RFID transponder is that the number of mobile devices, which support RFID standards, is relatively small, Therefore RFID transponders are often used as data carriers for access authorizations, which, on the one hand, leads to higher cost and on the other, to the necessity for the users of the access control system to carry a further component.

Moreover, due to the barriers employed in existing access control devices and the blocking of access connected with it, access, in particular for persons, is rendered uncomfortable. Access control performed in conjunction with barriers thus leads to stress, which has a significant adverse effect on people's enjoyment of their leisure activities. In addition, in the case of indexing transport means such as cable cars or ski lifts, the provision of barriers often means that the carrying capacity of the transport means is not used to the fullest extent.

SUMMARY OF THE INVENTION

The present invention is based on the requirement to propose a method for access control, which when executed simplifies access control. Furthermore a system is proposed for performing the method according to the invention. Further inventive developments and advantages are revealed in the corresponding sub-claims.

Accordingly a method for access control is proposed, as part of which verification of an access authorization is effected by way of evaluating an ID sent at regular intervals from a mobile electronic device nearest an access control device or a data carrier nearest an access control device via the Bluetooth Low Energy Standard (called BLE hereunder) as part of a "broadcasting", to which at least one access authorization is unequivocally assigned, which is received by BLE transceiver units connected to a computer comprising a CPU and storage means within range of the mobile electronic device or the data carrier, wherein localisation of the mobile electronic devices or the data carriers is carried out by means of evaluation of the RSSI (Received Signal Strength Indicator), wherein the signal strength is measured, with which the signal of a mobile electronic device or a data carrier containing the ID of BLE transceiver units, is received.

Use of the Bluetooth Low Energy Standard, called BLE hereunder, leads to a distinct drop in energy consumption compared to the conventional Bluetooth Standard and advantageously also to a longer range, which may be as much as 100 meters.

Due to using the long-range energy-saving BLE Standard, IDs sent from mobile electronic devices such as smartphones, tablets or smartwatches or from data carriers, which have access authorizations unequivocally assigned to them, can be received by BLE transceiver units without a significant increase in power consumption. After receiving an ID from at least one BLE transceiver unit the first thing to be performed is localization, where for a mobile electronic device nearest an access control device in access direction or a data carrier nearest an access control device it is checked whether a valid access authorization assigned to this ID, wherein this evaluation is carried out in a computer connected to the BLE transceiver unit, or in a server connected to the computer. The ID could, for example, be a serial number of the mobile electronic device or the data carrier. Alternatively the access authorizations could be stored directly in the mobile electronic devices or the data carriers.

According to the invention, in the case of an access control system with multi-lane access, wherein each lane has an access control device assigned to it, it is proposed that each access control device comprises at least one BLE transceiver unit, wherein the BLE transceiver units are preferably arranged in such a way that the access width is flanked by two BLE transceiver units and wherein the BLE transceiver units are connected to a computer comprising a CPU and storage means. The computer is connected via a suitable interface with a server in a wireless or hard-wired manner.

As part of a so-called "broadcasting" the mobile electronic devices or data carriers send an ID at regular intervals via the BLE standard, which ID has at least one access authorization assigned to it. When a BLE transceiver unit is within range of a mobile electronic device or a data carrier, the ID is received by the BLE transceiver unit. According to the invention, localization of the mobile electronic devices or the data carriers is then carried out by means of evaluation of the RSSI (Received Signal Strength Indicator), wherein the signal strength is measured, with which the signal of a mobile electronic device or a data carrier is received by BLE transceiver units.

As part of a first development, using the ratio of the Received Signal Strength Indicators with which BLE transceiver units of the access control system receive the signal of a mobile electronic device or a data carrier containing the ID, which has at least one access authorization unequivocally assigned to it, the ratio of the distances of the mobile electronic device or the data carrier from the BLE transceiver units is ascertained. The higher the signal strength and thus the Received Signal Strength Indicator, the shorter is the distance to a BLE transceiver unit, so that in this way using the relative distances of the mobile electronic devices or data carriers to the BLE transceiver units, that lane is ascertained, in which the mobile electronic device or the data carrier is located.

As part of a further development using a reference signal strength, which as a rule corresponds to the signal strength at a 1 meter distance and which is contained as information in the signal of the mobile electronic device or the data carrier or kept in a table stored in the computer in dependence of the mobile electronic device or data carrier, e.g. the type of mobile telephone, the distance between the mobile electronic device and the BLE transceiver units is ascertained with an accuracy of 1-2 meters, so that for a multi-lane access, using subsequent trilateration or, for more than three BLE transceiver units, multilateration, that lane is ascertained with a high accuracy, in which the mobile electronic device or the data carrier is located.

According to the invention using the ascertained absolute or relative distances between all mobile electronic devices or data carriers detected by BLE transceiver units and assigned to a lane and the BLE transceiver units, the sequence of the mobile electronic devices or data carriers in the respective lane is ascertained. This allows access control to be performed, since it is known, which mobile electronic device or data carrier is nearest an access control device so that its ID is evaluated with reference to a valid access authorization.

Given the case that the access width is flanked by two BLE transceiver units and the Received Signal Strength Indicator at both BLE transceiver units shows that the probability of residence of a mobile electronic device or the data carrier in the lane ahead of the pass-through line is highest, this mobile electronic device or the data carrier, as part of the further development of the invention, is regarded to be relevant for access control and the ID is analysed relative to a valid access authorization. The higher the signal strength, the shorter is the distance of a mobile electronic device or a data carrier to the two BLE transceiver units and thus to the access control device.

In the case of an access control system with one-lane access an access control device assigned to the single lane is provided, wherein the access width is flanked by two BLE transceiver units. A mobile electronic device or a data carrier are assigned to the lane, if the signal strength, with which the signal of a mobile electronic device or a data carrier is received by both BLE transceiver units, is approximately equal. Ascertaining the sequence of the mobile electronic devices or data carriers in the lane is effected using the signal strength, with which the signal of a mobile electronic device or a data carrier is received by both BLE transceiver units. The higher the signal strength, the shorter is the distance of a mobile electronic device or a data carrier from the two BLE transceiver units and thus from the access control device, As part of a further development of the invention, with an access control system with one-lane access an access control device assigned to the single lane may be provided, wherein the access control device comprises one BLE transceiver unit. Ascertaining the sequence of the mobile electronic devices or data carriers in the one lane is effected by way of the signal strength, with which the signal of a mobile electronic device or data carrier is received from the BLE transceiver unit; the higher the signal strength, the shorter is the distance of a mobile electronic device or a data carrier to the two BLE transceiver units and thus to the access control device.

The access control devices of the access control system may be designed advantageously without barriers, wherein the access control devices each comprise a device for detecting persons, which pass the access control device. For example, the device for detecting persons may be designed as a light barrier or weighing sensor.

When a person passes an access control device, which is detected by the device for detecting persons, and if, following the passing of this person the mobile electronic device or the data carrier in first place in the lane assigned to the access control device according to the localization is the same according to the received ID as before the passing of the person, an access without authorization is recognized and an optical and/or acoustic signal is issued.

Alternatively, the access control devices of the access control system may each comprise a barrier, which is operated in an opening direction, if the ID of the mobile electronic device or data carrier, which according to the localization, is in first place in the lane assigned to the access control device, has a valid access authorization assigned to it. If following the passing of a persons—a fact which is detected by a device for detecting persons or by operating the barrier —the mobile electronic device residing, according to the localization in first place in the lane assigned to the access control device is the same as that prior to the passing of the person, access without authorization is recognized and an optical and/or acoustic signal is issued.

According to a further development of the invention, at least one BLE transceiver unit is assigned to the entry area of an access control system, which detects the mobile electronic devices or data carriers by way of the ID sent from the mobile electronic devices or data carriers, which pass through the entry area, wherein the exit area of the access control system has at least one BLE transceiver unit assigned to it, which detects the mobile electronic devices or data carriers by way of the ID sent from the mobile electronic devices or data carriers, which pass through the exit area, wherein the only signals evaluated by the BLE transceiver units of the access control devices are signals which are detected by the at least one BLE transceiver unit assigned to the entry area and not yet detected by the at least one BLE transceiver unit assigned to the exit area. Detection of the mobile electronic devices or data carriers which pass through the entry area or the exit area is restricted to signals, whose signal strength lies above a predefined threshold, and only these signals are evaluated. This has the effect of preventing mobile electronic devices or data carriers from being detected, which are outside the access control system.

The BLE transceiver units assigned to the entry area and/or the exit area may also be used in an advantageous manner for increasing the accuracy of determining the sequence of the mobile electronic devices or data carriers in the respective lane, wherein to this end all signals of the mobile electronic devices or data carriers are evaluated, which have passed through the entry area, with the exception of electronic devices or data carriers, which have passed through the exit area. In order to increase the accuracy of determining the sequence of the mobile electronic devices or data carriers in the respective lane, these are localized by trilateration or, in case of more than three BLE transceiver units, by multilateration, wherein for trilateration or multilateration the relative or absolute distances between the mobile electronic devices or data carriers and the BLE transceiver units of the access control devices and the relative or absolute distances between the mobile electronic devices or data carriers and the BLE transceiver units assigned to the entry area and/or the exit area are utilised. The relative or absolute distances between the mobile electronic devices or data carriers and the BLE transceiver units are ascertained, as already discussed, by way of the Received Signal Strength Indicators. By taking into account the BLE transceiver units assigned to the entry area and/or the exit area of an access control system, the accuracy of determining the sequence of the mobile electronic devices or data carriers in the respective lane is increased, since these BLE transceiver units, with reference to the BLE transceiver units of the access control devices are assigned in such a way that respectively two transceiver units of the access control devices and the BLE transceiver units assigned to the entry area and/or the exit area of an access control system form a triangle.

Due to the method according to the invention it is not persons which are detected, but mobile electronic devices or data carriers.

BRIEF DESCRIPTION OF THE DRAWINGS

The invention will now be explained in detail by way of example with reference to the attached figures, in which.

DETAILED DESCRIPTION OF THE INVENTION

Figure 1:
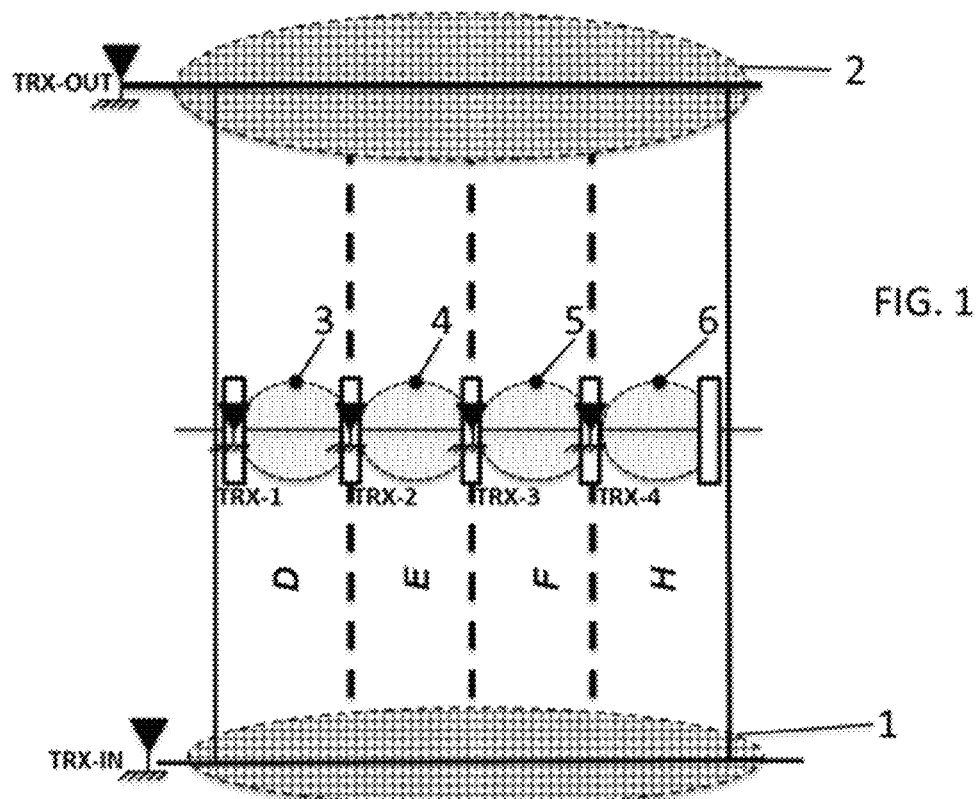
FIG. 1 shows a schematic drawing of an access control system realised according to the invention with multi-lane access.

FIG. 1 shows an access control system realised according to the invention with four-lane access, comprising four lanes D, E, F and H, an entry area 1 and an exit area 2. It also comprises access control devices 3, 4, 5, 6, each of which have a lane D, E, F, H assigned to them, wherein each access control device 3, 4, 5, 6 comprises at least one BLE transceiver unit TRX-1, TRX-2, TRX-3, TRX-4. Further, two further BLE transceiver units TRX-IN, TRX-OUT are provided, which are assigned to the entry area I the exit area 1, 2. In the example shown, the BLE transceiver units TRX-1, TRX-2, TRX-3, TRX-4 are arranged in such a way that the access widths of lanes D, E, F are each flanked by two BLE transceiver units. In terms of a further development not shown, a further BLE transceiver unit may be provided, so that lane H is also flanked by two BLE transceiver units.

The BLE transceiver units TRX-1, TRX-2, TRX-3, TRX-4, TRX-IN, TRX-OUT are connected to a computer comprising a CPU and storage means, wherein verification of the access authorization is effected by means of an interaction between a BLE transceiver unit TRX-1, TRX-2, TRX-3, TRX-4 and an electronic device or a data carrier, on which an ID, to which at least one access authorization is assigned, is stored based on the Bluetooth Low Energy Standard. The invention will now be explained in terms of how mobile electronic devices are used in this context The mobile electronic devices send an ID as part of a so-called "broadcasting" at regular intervals via the BLE standard, which ID has at least one access authorization assigned to it. When a BLE transceiver unit TRX-1, TRX-2, TRX-3, TRX-4 is within range of a mobile electronic device, the ID is received by the BLE transceiver unit via BLE. This involves localization of the mobile electronic units by means of the RSSI (Received Signal Strength Indicator), wherein the signal strength is measured, with which the signal of a mobile electronic unit is received by BLE transceiver units.

As part of a first development of the method according to the invention, the ratio of the distances of the mobile electronic device or data carrier to the BLE transceiver units is ascertained using the ratio of the Received Signal Strength Indicators, with which BLE transceiver units of the access control system receive the signal of a mobile electronic device or a data carrier containing the ID, which has at least one access authorisation unequivocally assigned to it. The higher the signal strength and thus the Received Signal Strength Indicator, the shorter is the distance to a BLE transceiver unit, so that in this way, using the relative distances of the mobile electronic device or the data carrier to the BLE transceiver units that lane is ascertained in which the mobile electronic device or the data carrier is located.

Referring to FIG. 1, the BLE transceiver unit TRX-IN, which is assigned to the entry area 1, detects the mobile electronic devices by way of the ID sent from the mobile electronic devices, which pass through the entry area 1, so that only signals from mobile electronic devices, which are detected by the BLE transceiver unit TRX-IN, are evaluated by the BLE transceiver units TRX-1, TRX-2, TRX-3, TRX-4 of the access control devices 3, 4, 5, 6. In this way it is ensured that any mobile devices, which on the one hand are within range of a BLE transceiver unit TRX-1, TRX-2, TRX-3, TRX-4 and on the other hand are outside the access control system, are not taken into account. Further, the BLE transceiver unit TRX-OUT, which is assigned to the exit area 2, will detect, using the ID sent from the mobile electronic devices, those mobile electronic devices, which pass through the exit area 2, and thus leave the access control system. Signals from mobile electronic devices, which are detected by the BLE transceiver unit TRX-OUT, are not evaluated by the BLE transceiver units TRX-1, TRX-2, TRX-3, TRX-4 of the access control devices 3, 4, 5, 6. As part of further developments the entry and exit areas can each have a number of BLE transceiver units assigned to them. To detect the mobile electronic devices or data carriers, which pass through the entry area or exit area, only those signals are evaluated, whose the signal strength lies above a predefined signal threshold. In this way it is avoided that mobile electronic devices or data carriers are detected, which are outside the access control system, An access control system according to the invention, in particular for performing the method according to the invention, thus comprises one-lane or multi-lane access, wherein each lane D, E, F, H has an access control device 3, 4, 5, 6 assigned to it, which comprises at least one BLE transceiver unit connected to a computer comprising a CPU and storage means and which receives an ID sent from mobile electronic devices or data carriers via the Bluetooth Low Energy Standard as part of a "broadcasting" at regular intervals and which has at least one access authorization unequivocally assigned to it, wherein verification of an access authorization is effected by way of evaluating an ID sent from a mobile electronic device nearest an access control device 3, 4, 5, 6 in access direction or from a data carrier nearest an access control device 3, 4, 5, 6.

With this arrangement at least one BLE transceiver unit TRX-IN is assigned to the entry area 1 of the access control system, which detects mobile electronic devices or data carriers by way of the ID sent by the mobile electronic devices or data carriers, which pass through the entry area 1, and wherein at least one BLE transceiver unit TRX-OUT is assigned to the exit area 2 of the access control system, which detects the mobile electronic devices or the data carriers by way of the ID sent by the mobile electronic devices, which pass through the exit area 2, wherein the mobile electronic devices or data carriers can be located by means of the RSSI (Received Signal Strength Indicator), wherein the signal strength is measured, with which the signal of a mobile electronic device or a data carrier is measured, which contains the ID of the BLE transceiver units TRX-1, TRX-2, TRX-3, TRX-4, to which the access control devices 3, 4, 5, 6 are assigned.

Figure 2:
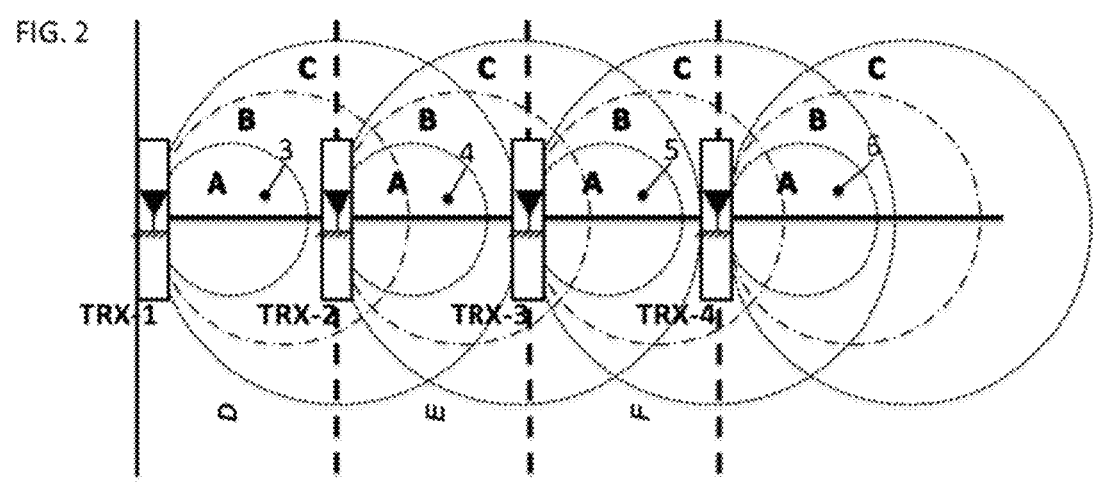
FIG. 2 shows a schematic drawing of part of an access control system realised according to the invention, with multi-lane access for illustrating, how the lane is determined, in which there is a mobile electronic device which supports BLE.

According to the invention and with reference to figure FIG. 2, using the ratio of the Received Signal Strength Indicators, with which BLE transceiver units TRX-1, TRX-2, TRX-3, TRX-4 of the access control system receive the signal of a mobile electronic device or data carrier containing the ID, which has at least one access authorization unequivocally assigned to it, the ratio of the distances of the mobile electronic device or the data carrier from the BLE transceiver units TRX-1, TRX-2, TRX-3, TRX-4 is ascertained. The higher the signal strength and thus the Received Signal Strength Indicator, the shorter is the distance from a BLE transceiver unit, so that in this way using the relative distances of the mobile electronic device from the BLE transceiver units TRX-1, TRX-2, TRX-3, TRX-4, that lane is ascertained, in which the mobile electronic device is located. This evaluation is carried out in the computer or in the server.

With this arrangement the distance of a mobile electronic device from the BLE transceiver units is divided into three distance ranges: "very near", "near", "remote", which are marked with the reference symbols A, B, C. The "very near" range may e.g. correspond to a distance of less than one meter, the "near" range may correspond to a distance between one and five meters and the "remote" range may correspond to a distance between five meters and ten metres. In terms of further developments and depending on the achievable accuracy of distance determination the distance in several distance ranges may be divided into e.g. four, five or six ranges, thereby increasing the resolution.

If with reference to FIG. 2, a mobile electronic device is in the "very near" range with regard to the BLE transceiver unit TRX-2 and in the "near" range with regard to the BLE transceiver unit TRX-1, the lane, in which the mobile electronic device is located is determined to be lane D, which has the access control device 3 assigned to it, which comprises the BLE transceiver unit TRX-1

Figure 3:
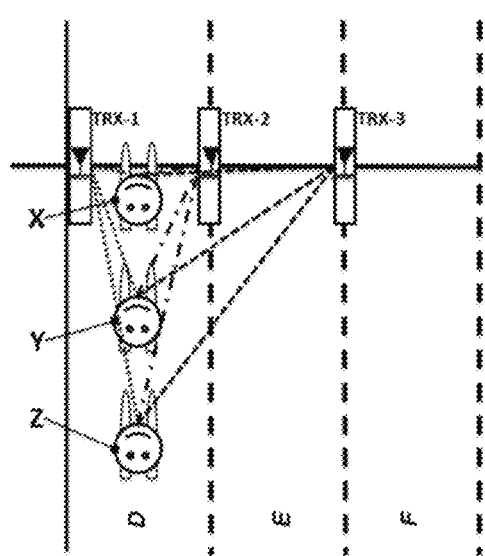
FIG. 3 shows a schematic drawing of part of an access control system realised according to the invention with multi-lane access for illustrating, how the sequence of the mobile electronic devices in the respective lane is determined, as well as a table for explaining the method of determining the sequence of the mobile electronic devices in the respective lane.
Figure 3:
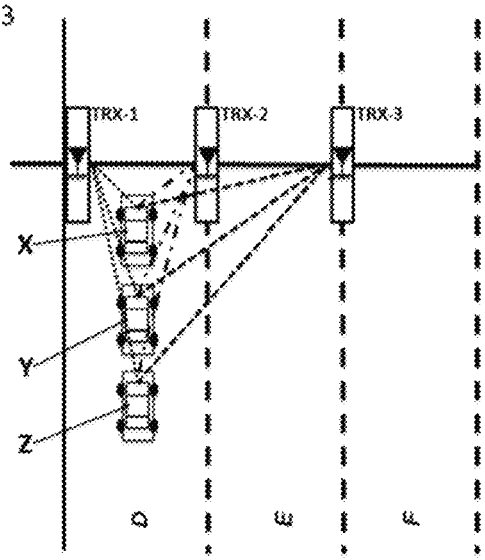

According to the invention and with reference to FIG. 3, using the ascertained distances or distance ranges between all mobile electronic devices, whose signal containing the ID of BLE transceiver units TRX-1, TRX-2, TRX-3 is received and which using the described method are assigned to a lane, and using the BLE transceiver units TRX-1, TRX-2, TRX-3, the sequence of the mobile electronic devices in the respective lane is ascertained. In the left-hand part of HG. 3 an access control system in a skiing area is shown, wherein there are three skiers X, Y, Z in lane D, each of which carries a mobile electronic device, the signal of which is received by the BLE transceiver units TRX-1, TRX-2, TRX-3.

As revealed in the table shown in FIG. 3, the skiers X, Y, Z, i.e. their mobile electronic devices, are detected by the three BLE transceiver units TRX-1, TRX-2, TRX-3. The columns PROX-1, PROX-2, PROX-3 correspond to the determined ranges A, B, or C between the mobile electronic devices of the skiers X, Y, Z and the BLE transceiver units TRX-1, TRX-2, TRX-3.

Skier X is therefore in the distance range A of the BLE transceiver unit TRX-1, in the distance range A of the BLE transceiver unit TRX-2 and in the distance range B of the BLE transceiver unit TRX-3, wherein skier Y is in the distance range A of the BLE transceiver unit TRX-1, in the distance range B of the BLE transceiver unit TRX-2 and in the distance range C of the BLE transceiver unit TRX-3, and skier Z is in the distance range B of the BLE transceiver unit TRX-1, in the distance range B of the BLE transceiver unit TRX-2 and in the distance range C of the BLE transceiver unit TRX-3. This shows that the sequence of the skiers in lane D is X, Y, Z.

The right-hand part of FIG. 3 shows the corresponding situation for a car park entry; the table also refers to this example.

Based on this information an access control can be carried out, because it is known which mobile electronic device or data carrier is nearest an access control device, so that his ID is evaluated with reference to a valid access authorization, Evaluation of the read-out access authorization may take place in the computer, to which the BLE transceiver units are connected, or in the server, to which the computer is connected.

As part of a further development of the invention it is proposed, to use so-called Angle of Arrival methods in order to increase the accuracy of the described lane determination and the described determination of the sequence of mobile electronic devices or data carriers in a lane. To this end the BLE transceiver units comprise at least two antennae, which receive the same signal emitted by a mobile electronic device or a data carrier at respectively different points in time and with a different phase, wherein the received points in time and the phase are dependent on the angle of incidence of the signal. The phase difference can then be used to determine the direction, from which the signal is emitted. In this way it can also be determined, whether a mobile electronic device or a data carrier is in access direction upstream of or already downstream of the access control devices.

The invention claimed is:

1. A method for access control, in an access control system with one or more lane access, each lane (D, E, F, H) having an access control device (3, 4, 5, 6) assigned thereto, which comprises at least one bluetooth low energy standard transceiver unit (TRX-1, TRX-2, TRX-3, TRX-4), wherein verification of access authorization comprises evaluating an ID sent at regular intervals from the mobile electronic device nearest the access control device (3, 4, 5, 6) or a data carrier nearest the access control device (3, 4, 5, 6), via the bluetooth low energy standard transceiver unit (TRX-1, TRX-2, TRX-3, TRX-4), as part of a "broadcasting", to which at least one access authorization is unequivocally assigned, receiving the at least one access authorization by the bluetooth low energy standard transceiver units (TRX-1, TRX-2, TRX-3, TRX-4) connected to a computer comprising a central processing unit and storage means within range of the mobile electronic device or the data carrier, localizing the mobile electronic devices or the data carriers by evaluating a Received Signal Strength Indicator (RSSI), by measuring the received signal strength of the mobile electronic device or the data carrier, which contains the ID of the bluetooth low energy standard transceiver units (TRX-1, TRX-2, TRX-3, TRX-4);

using a ratio of the Received Signal Strength Indicators, of which the bluetooth low energy standard transceiver units (TRX-1, TRX-2, TRX-3, TRX-4) of the access control system have received the signal of the mobile electronic device or the data carrier containing the ID;

ascertaining the ratio of distances of the mobile electronic device or the data carrier to the bluetooth low energy standard transceiver units (TRX-1, TRX-2, TRX-3, TRX-4): and ascertaining the lane in which the mobile electronic device or the data carrier is located by using the relative distances of the mobile electronic device or the data carrier to the bluetooth low energy standard transceiver units (TRX-1, TRX-2, TRX-3, TRX-4).

2. The method for access authorization according to claim 1, further comprising using the relative distances between all of the mobile electronic devices or all of the data carriers detected by the bluetooth low energy standard transceiver units (TRX-1, TRX-2, TRX-3, TRX-4) which have been detected and have had a lane assigned to them, and the bluetooth low energy standard transceiver units (TRX-1, TRX-2, TRX-3, TRX-4), to ascertain a sequence of the mobile electronic devices or the data carriers in the respective lane (D, E, F, H).

3. The method for access authorization according to claim 1, further comprising using a reference signal strength, which as a rule corresponds to a signal strength at 1 meter distance and which is contained as information in the signal of the mobile electronic devices or the data carriers or is held in a table stored in the computer depending on the mobile electronic device or the data carrier, wherein the distance between the mobile electronic device or the data carrier and the bluetooth low energy standard transceiver units (TRX-1, TRX-2, TRX-3 TRX-4) is ascertained with an accuracy of 1-2 meters, so that by a subsequent trilateration or, by multilateration for more than three bluetooth low energy standard transceiver units (TRX-1, TRX-2, TRX-3, TRX-4), that lane (D, E, F, H) is ascertained, in which the mobile electronic device or the data carrier is located.

4. The method for access authorization according to claim 2, wherein in order to increase a accuracy of lane determination and in order to determine the sequence of mobile electronic devices or data carriers in the lane (D, E, F, H), angle of arrival methods are performed, wherein the bluetooth low energy standard transceiver units (TRX-1, TRX-2, TRX-3, TRX-4) comprise at least two antennae, which receive the same signal, which is emitted from the mobile electronic device or data carrier, at respectively different points in time and with a different phase, wherein the received points in time and the phase are dependent on a angle of incidence of the signal, and subsequently a phase difference is used to determine the direction from which the signal is emitted.

5. The method for access authorization according to claim 1, wherein the access control system has one-lane access with an access control device provided and assigned to the lane, the one-lane access has a width flanked by two bluetooth low energy standard transceiver units, wherein the mobile electronic device or the data carrier is assigned to the one-lane, determination of the sequence of the mobile electronic devices or the data carriers in the one-lane utilizes the signal strength received by both the bluetooth low energy standard transceiver units.

6. The method for access authorization according to claim 2, wherein an entry area (1) of the access control system has at least one bluetooth low energy standard transceiver unit (TRX-IN) assigned thereto, which detects the mobile electronic devices or data carriers by way of the ID sent by the mobile electronic devices or data carriers, which pass through the entry area (1) and an exit area (2) of the access control system has at least one bluetooth low energy standard transceiver unit (TRX-OUT) assigned thereto, which detects the mobile electronic devices or data carriers by way of the ID sent by the mobile electronic devices or data carriers, which pass through the exit area (2), wherein only signals from mobile electronic devices or data carriers, which have been detected by the at least one bluetooth low energy standard transceiver unit (TRX-IN) assigned to the entry area (1) and are not yet detected by the at least one bluetooth low energy standard transceiver unit (TRX-OUT) assigned to the exit area (2), are evaluated by the bluetooth low enemy transceiver unit (TRX-1, TRX-2, TRX-3, TRX-4) of the access control devices (3, 4, 5, 6), and detection of the mobile electronic devices or data carriers which pass through the entry area (1) or the exit area (2) is restricted to signals, whose signal strength lies above a predefined threshold, and only these signals are evaluated.

7. The method for access authorization according to claim 6, wherein the bluetooth low energy standard transceiver units may be assigned to the entry area (1) or the exit area (2) of an access control system and are used for increasing a accuracy of determining the sequence of the mobile electronic devices or data carriers in the respective lane, all signals of the mobile electronic devices or data carriers which have passed through the entry area (1), with the exception of the electronic devices or data carriers which have passed through the exit area (2) are evaluated, wherein in order to increase the accuracy in determining the sequence of the mobile electronic devices or data carriers in the respective lane these are located by trilateration or, in case of more than three bluetooth low energy standard transceiver units by multilateration, wherein trilateration or multilateration is carried out using relative or absolute distances between the mobile electronic devices or data carriers and bluetooth low energy transceiver units of the access control devices and relative or absolute distances between the mobile electronic devices or data carriers and the bluetooth low energy standard transceiver units assigned to the entry area and/or the exit area.

8. The method for access authorization according to claim 2, wherein the access control devices (3, 4, 5, 6) do not comprise barriers, wherein, if a person passes the access control device (3, 4, 5, 6), this is detected by a device for detecting persons, after this person has passed the mobile electronic device located that according to the localization was in first place in the lane (D, E, F, H) assigned to the access control device (3, 4, 5, 6) is the same as a previously received ID, access without access authorization is recognized and an optical or acoustic signal is issued.

9. The method for access authorization according to claim 2, wherein the access control devices (3, 4, 5, 6) comprise a barrier, which is operated in an opening direction, if a valid access authorization is assigned to the ID of the mobile electronic device or data carrier that was located according to the localization in first place in the lane (D, E, F, H) assigned to the access control device (3, 4, 5, 6), and if a person passes an access control device (3, 4, 5, 6), this is recognized by a device for the detection of persons or by operating the barrier, if following the passing of this person the mobile electronic device located according to the received ID, is the same as the previously received ID, access without access authorization is recognized and an optical and/or acoustic signal is issued.

10. An access control system, in particular for performing the method according to claim 1, the access control system having an entry and exit area (1, 2), wherein the access control system comprises one-lane or multi-lane access, wherein each lane (D, E, F, H) has an access control device (3, 4, 5, 6) assigned to it, which comprises at least one bluetooth low energy standard transceiver unit (TRX-1, TRX-2, TRX-3, TRX-4), which is connected to a computer comprising a central processing unit and storage means and which receives an ID sent at regular intervals from mobile electronic devices or data carriers via the bluetooth low energy standard as part of a "broadcasting", and has at least one access authorization unequivocally assigned thereto, wherein verification of an access authorization is by evaluating an ID sent by the mobile electronic device nearest the access control device (3, 4, 5, 6) in access direction or the data carrier nearest the access control device (3, 4, 5, 6), wherein at least one bluetooth low energy standard transceiver unit (TRX-IN) is assigned to the entry area (1) of the access control system, which transceiver detects mobile electronic devices or data carriers by way of the ID sent by the mobile electronic devices or data carriers, which pass through the entry area (1) and wherein the exit area (2) of the access control system has at least one bluetooth low energy standard transceiver unit (TRX-OUT) assigned thereto, which detects the mobile electronic devices or data carriers by way of the ID sent by the mobile electronic devices or data carriers, which pass through the exit area (2), wherein the mobile electronic devices or data carriers can be located by means of the evaluation of a received signal strength indicator, wherein a signal strength is measured, from the mobile electronic device or the data carrier containing the ID received by the bluetooth low energy standard transceiver units (TRX-1, TRX-2, TRX-3, TRX-4) assigned to the access control devices (3, 4, 5, 6).

11. The access control system according to claim 10, wherein the access control devices (3, 4, 5, 6) do not comprise a barrier, wherein each access control device (3, 4, 5, 6) comprises a device for the detection of people.

12. The access control system according to claim 10, wherein the access control system has one-lane access, and the access control device assigned to the single lane is provided, wherein an access width is flanked by two bluetooth low energy standard transceiver units.

* * * * *